United States Patent
Schürmann

(10) Patent No.: US 11,701,793 B2
(45) Date of Patent: *Jul. 18, 2023

(54) METHOD FOR PROCESSING PANEL-SHAPED WORKPIECES

(71) Applicant: IMA Schelling Deutschland GmbH, Lübbecke (DE)

(72) Inventor: Ralf Schürmann, Stemwede (DE)

(73) Assignee: IMA Schelling Deutschland GmbH, Lübbecke (DE)

( * ) Notice: Subject to any disclaimer, the term of this patent is extended or adjusted under 35 U.S.C. 154(b) by 169 days.

This patent is subject to a terminal disclaimer.

(21) Appl. No.: 17/308,278

(22) Filed: May 5, 2021

(65) Prior Publication Data

US 2021/0379792 A1 Dec. 9, 2021

(30) Foreign Application Priority Data

Jun. 9, 2020 (DE) .......................... 102020115230.2

(51) Int. Cl.
*B27M 1/08* (2006.01)
*B27D 5/00* (2006.01)

(52) U.S. Cl.
CPC ............... *B27M 1/08* (2013.01); *B27D 5/003* (2013.01)

(58) Field of Classification Search
CPC ... B27M 1/08; B27C 5/06; B27D 1/04; B27D 1/06; B27D 1/08; B27B 25/00;
(Continued)

(56) References Cited

U.S. PATENT DOCUMENTS 5,064,048 A * 11/1991 Becker .................... B23Q 3/186
83/423
7,966,714 B2 * 6/2011 Dick ......................... B27M 1/08
29/897
(Continued)

FOREIGN PATENT DOCUMENTS

AT 500768 A1 3/2006
DE 102005004578 A1 8/2006
(Continued)

*Primary Examiner* — Matthew Katcoff
(74) *Attorney, Agent, or Firm* — Laurence P. Colton; Smith Tempel Blaha LLC

(57) ABSTRACT

A method for processing panel-shaped workpieces having the steps of providing a large-format panel, and feeding the large-format panel to a detachment station; detaching panel-shaped workpieces by dividing the large-format panel in the detachment station by making cuts in the large-format panel using a detachment unit; and feeding the workpieces thus detached to a downstream processing station in order to complete the panel-shaped workpiece. In step b) at least a part of each detached workpiece acquires from the detachment unit an alignment section for engaging gripping elements and/or introducing reference bores. After the workpiece provided with the alignment section has been detached it is taken over by a gripping element, engaging element or grasping element which engages the alignment section. After the workpiece is taken over, the gripping element, engaging element or grasping element engaging in a form-fitting manner on the alignment section of the workpiece runs through a cycle.

13 Claims, 7 Drawing Sheets

(58) Field of Classification Search
CPC ......... B27B 25/06; B27B 29/00; B27B 29/02; B27B 31/00; B27B 31/08; B23D 47/04; B23D 47/042; B65G 47/22; B23Q 7/18; B23Q 3/00; B25B 11/00
See application file for complete search history.

(56) References Cited

U.S. PATENT DOCUMENTS

| | | | | |
|---|---|---|---|---|
| 8,245,742 B2 * | 8/2012 | Filion | ................... | B27M 3/006 |
| | | | | 144/350 |
| 2008/0099105 A1 * | 5/2008 | Kelly | ...................... | B27G 1/00 |
| | | | | 144/373 |

FOREIGN PATENT DOCUMENTS

| | | |
|---|---|---|
| DE | 102006027013 B3 | 1/2008 |
| DE | 102008032160 A1 | 1/2010 |
| DE | 202009002435 U1 | 7/2010 |
| DE | 102014204695 A1 | 9/2015 |
| DE | 102016203674 A1 | 9/2017 |
| DE | 102017002271 A1 | 9/2018 |
| DE | 102018131527 A1 | 6/2020 |

* cited by examiner

METHOD FOR PROCESSING PANEL-SHAPED WORKPIECES

CROSS REFERENCE TO RELATED APPLICATIONS

This patent application claims priority on and the benefit of German patent application number DE 10 2020 115 230.2 having a filing date of 9 Jun. 2020.

BACKGROUND OF THE INVENTION

Technical Field

The invention relates to a method for processing panel-shaped workpieces, in particular made of wood or wood substitutes, comprising the steps of providing a large-format panel, in particular made of wood or wood substitute materials, and feeding the large-format panel to a detachment station, detaching panel-shaped workpieces by dividing the provided large-format panel in the detachment station by making cuts in the large-format panel using at least one detachment unit, feeding the workpieces thus detached to at least one downstream processing station in order to complete the panel-shaped workpiece.

Prior Art

AT 500 768 A1 discloses a processing machine with various units for sawing, milling or drilling. The workpieces are aligned by means of stops and the processing machines are positioned accordingly.

Since various processing units on such systems are not being used at any one time, there has been a move to spatially separate the detachment and the post-processing. In known methods of this type, panel-shaped workpieces are usually provided as large-format panels at the start of production. The said large-format panel is to be detached in a detachment station according to a cutting plan. The detached panels are then ejected from the detachment station and passed on to downstream processing units.

DE 10 2008 032 160 A1 discloses a method for dividing panels, in which markings are introduced, a separating cut is made and the separated workpieces are discharged for further separation, where they are manually rotated by 90° and are returned to the machine for further cutting. There they are aligned, finally cut to size and discharged again, where they are manually stored.

DE 10 2014 204 695 A1 discloses an image capture method for a detaching/processing machine, wherein the image capture records the size and the processing state and based on this information it issues destacking instructions for manual destacking for further processing.

DE 10 2016 203 674 A1 discloses a workpiece detection system which determines instructions for further treatment for the operator.

DE 10 2005 004 578 A1 describes a method for operating a wood processing machine which aims to be able to process workpieces for which processing requires reclamping. For this purpose, a corresponding processing machine has two workpiece tables, both of which can be used during processing.

DE 10 2006 027 013 B3 describes a machine for formatting panels, with the aid of which the continuous production of formatted panels can be achieved, even if the panels have a different format. For this purpose, a gantry machine which has the option of double occupancy is used to format the panel blanks. Two panel conveyor devices in the form of parallel conveyor tracks are used to transport the panels. In this way, raw panels can be aligned on two alignment stations, which saves time.

From DE 20 2009 002 435 U1 a device for processing panel-shaped workpieces is known, with the aid of which a fast and precise processing of panel-shaped workpieces is possible even with complex processing tasks. For this purpose, the processing unit used has a circular saw which can be pivoted about a vertical axis, wherein a positioning device for the workpiece has a plurality of grippers that can be actuated separately from one another for positioning a plurality of workpieces. In this way, a plurality of workpieces can be processed using the processing unit.

A method for processing panel-shaped workpieces is known from DE 10 2018 131 527 A1, with the aid of which the process speed can be increased, particularly in the case of batch size 1 production. For this purpose, a finishing step is already carried out—as far as possible—during the detachment process of a large-format panel. In this way, processing steps that would actually have to be carried out after the detachment by a subsequent processing unit can already take place during the detachment. The downstream processing unit is thereby relieved of load, which is why the process as a whole can be accelerated.

In the course of increasing automation as well as increasing demands with regard to production in batch size 1, the demands on the process speed are also increasing continuously. The problem with known detachment stations, as disclosed in DE 10 2017 002 271 A1, is that the component in question basically has to be realigned when it is transferred to a downstream processing station and, if necessary, has to be clamped in a defined alignment. The downstream processing station must therefore first align the detached workpiece when it is taken over in order to be able to process it according to the plan.

Of course, this step takes time, which reduces the process speed, since the time it takes for a workpiece to travel from being cut out of the large-format panel to being picked in a corresponding wood processing plant is decisive for the process speed.

BRIEF SUMMARY OF THE INVENTION

Therefore the object of the invention is to specify a method for processing panel-shaped workpieces, by means of which the disadvantages described above can be minimized, in particular increasing the process speed and favoring the production of batch size 1 by improving the material flow.

This object is achieved by a method for processing panel-shaped workpieces, in particular made of wood or wood substitutes, in which the following steps are carried out:

a) providing a large-format panel, in particular made of wood or wood substitute materials, and feeding the large-format panel to a detachment station, b) detaching panel-shaped workpieces by dividing the provided large-format panel in the detachment station by making cuts in the large-format panel using at least one detachment unit, and c) feeding the workpieces thus detached to at least one downstream processing station in order to complete the panel-shaped workpiece, characterized in that in step b) at least a part of each detached workpiece acquires from the detachment unit an alignment section for engaging gripping elements and/or introducing reference bores, wherein after the workpiece provided with the alignment section has been detached it is taken over by means of a gripping element, engaging element or grasping element which engages the alignment section, wherein after the workpiece is taken over, the gripping element, engaging element or grasping element engaging in a form-fitting manner on the alignment section of the workpiece runs through a cycle. Advantageous embodiments can be found in the dependent claims.

In the method according to the invention for processing panel-shaped workpieces, in particular made of wood or wood substitutes, the following steps are carried out:
a) providing a large-format panel, in particular made of wood or wood substitute materials, and feeding the large-format panel to a detachment station,
b) detaching panel-shaped workpieces by dividing the provided large-format panel in the detachment station by making cuts in the large-format panel using at least one detachment unit, and
c) feeding the workpieces thus detached to at least one downstream processing station in order to complete the panel-shaped workpiece.

According to the invention, in step b) at least a part of each detached workpiece acquires from the detachment unit an alignment section for engaging gripping elements and/or introducing reference bores, wherein after the workpiece provided with the alignment section has been detached it is taken over by means of a gripping element, engaging element or grasping element which engages the alignment section. A gripping element in the sense of the invention is not only a gripper, but any element which can be brought into engagement with the alignment section at least in a form-fitting manner. A gripping element is therefore also an engaging element or grasping element. Thus the gripping element, engaging element or grasping element according to the invention can also be an element which is oriented only so as to pull along the panel-shaped workpiece in question on which the alignment section is located. According to the invention, after the workpiece is taken over, the gripping element, engaging element or grasping element engaging in a form-fitting manner on the alignment section of the workpiece runs through a return cycle.

Therefore, if only a gripping element is mentioned below, the explanations also apply mutatis mutandis to an engagement element or grasping element. It is important that said element interacts at least in a form-fitting manner with the alignment section of the workpiece.

On the one hand, the cycle according to the invention makes it possible for the gripping element, engaging element or grasping element which engages in a form-fitting manner to be returned to the transfer point at which a new workpiece can be picked up. Furthermore, it can of course also be provided that the cycle also has one or more processing station(s) in order to process the workpiece guided through the cycle. The workpiece can be ejected from the cycle at any point or can run through the entire cycle. The latter can be advantageous if, for example, downstream processing steps are required that cannot be accommodated in the cycle. The positive engagement of the gripping element, engaging element or grasping element on the workpiece has the advantage, especially with intended cycle management, that the workpiece can be rotated without having to unclamp it again or transfer it in any form.

Panel-shaped workpieces within the meaning of this invention can be workpieces made of wood or wood substitute materials, but also lightweight panels, plasterboard, fiber cement panels or generally panels made of other materials, as well as panels that are used in particular for automobile construction or generally for use as components for other constructions.

The basic idea of the invention is to ensure during the detachment process that the workpiece later separated out from the large-format panel already acquires a reference for aligning the workpiece in the subsequent process. Such a reference can be, for example, an alignment section, i.e., a section protruding beyond the finished format of the cut-out workpiece to be created later and/or an introduced reference made in any way, for example a hole or the like, which is introduced by a unit into the workpiece or into a remaining edge area.

In order that, after the detachment, the detached workpieces are not transported further in an uncontrolled manner, in particular in a position in which the alignment is not defined, after the workpieces provided with the alignment section have been detached, they are taken over by a gripping element engaging on the alignment section. The gripping element takes on the alignment of the workpiece, wherein it preferably engages the alignment section in a form-fitting manner and controls the workpiece and, in doing so, transports it onward, preferably aligned, to the at least one downstream processing station.

Since, according to the invention, a step or partial step for aligning the workpiece is already carried out during the detachment process, this no longer needs to be carried out in the downstream processing unit, which significantly reduces the process time and, in particular in the case of batch size 1, can contribute to significant acceleration of the process.

In a preferred method, the gripping element comprises a gripper which engages the alignment section. As an alternative or in addition to this, the gripping element can have a centering or aligning element. This is preferably a mandrel, bolt or pin. For this gripping element, in step b. or before or after it, a reference bore in which said centering or alignment element then engages is introduced into the alignment section.

If said reference bores have been introduced, preferably in step b), they can be used for centering and alignment. For this purpose, the gripping element can be equipped with centering or alignment elements which engage in the corresponding reference bores. With the knowledge of the position and alignment of the gripping elements, it is possible to calculate the position and alignment of the workpieces. This type of alignment can be used in addition to gripping the workpieces or can even be used as the sole alignment device. Alignment is simple and precise with clearly defined reference points.

In the method according to the invention, the process time can be shortened even more if further method steps for the production of a finished part are already carried out in the detachment process. For this purpose, it can be provided according to a variant of the method according to the invention that at least one final cut is carried out by the detachment unit in step b), wherein the alignment section is provided on a part of the individual detached workpiece which is free of final cuts. Of course, several final cuts can also be provided, depending on the geometry of the part that is cut out later. Performing final cuts means that these cuts do not need to be made during later processing and save further process time, because final cuts are already carried out by the detachment station.

For further or alternative process optimization, it can also be provided that detachment units are designed, in addition to detaching the workpiece, to introduce additional processing steps, in particular rabbets, grooves, bores and/or recesses into the workpiece. In this way, processing steps which must normally be carried out by downstream processing stations can be moved forward to the detachment station.

The at least one detachment unit of the detachment station preferably comprises at least one milling unit and/or a sawing unit. Other units can—as indicated above—also be provided in the detachment station.

The detachment station preferably comprises a processing table, wherein the detachment unit is mounted thereon such that it is displaceable in a first direction, in particular on a gantry. A gantry does not necessarily have to be used, and the corresponding displacement devices can also be mounted displaceably below the processing table surface, for example.

It may be provided that the at least one detachment unit is displaceable in a second direction, in particular perpendicular to the first direction. The large-format panel can be divided up by a combination of the movement of the detachment unit and the panel itself.

In general, it can be provided that a panel-shaped workpiece is cut out of the large-format panel by bringing the detachment unit into engagement with the large-format panel and moving the large-format panel in the first direction and/or moving the detachment unit in the second direction.

Once the detachment has been carried out at the detachment station, a downstream processing station can be loaded with the detached workpiece by the method according to the invention. For this purpose, according to a preferred embodiment the method according to the invention provides that at least one of the following processing steps is carried out at the at least one downstream processing station:
 i) picking up and aligning a detached workpiece on the alignment section,
 ii) coating a narrow side of the panel-shaped workpiece with an edge strip,
 iii) carrying out a final cut on a not yet fully formatted narrow side of the panel-shaped workpiece,
 iv) introducing at least one bore into the panel-shaped workpiece,
 v) finishing the workpiece provided with an edge strip.

The above list is not exhaustive; of course, other processing steps can also be carried out at one or a plurality of processing stations connected downstream of the detachment station.

In principle, therefore, the downstream processing stations can carry out very different actions. In particular, but not exclusively with regard to the local application of wood processing, it has been found to be preferable if a processing center and/or a through-feed machine and/or a drilling machine is used as at least one downstream processing station.

If the detachment station should carry out final cuts, a special variant of the method can also provide that waste produced in the region of the final cuts in step b) is discarded before or during step c). This makes it possible, in particular, to dispose of disruptive offcuts before they are transferred to a processing station downstream of the detachment station and thus to minimize the amount of material flow in any case.

Depending on the actions that the detachment station carries out, i.e., what shape the alignment section should always be, the alignment section of a panel-shaped workpiece detached in step b) can be used in the further processing process to align the workpiece concerned.

Should the alignment section no longer be required if, for example, the workpiece is correspondingly aligned in a processing station downstream of the detachment station during finishing, the method according to the invention can provide that the alignment section is removed in or after step c) by a final cut or at least by a separating cut. According to a preferred embodiment of the present invention, it is provided that the alignment section is removed in the at least one downstream processing station, in particular in the last processing step.

BRIEF DESCRIPTION OF THE DRAWINGS

The invention will now be explained in more detail below with reference to FIGS. 1 to 4H.

DETAILED DESCRIPTION OF PREFERRED EMBODIMENTS

Figure 1A:
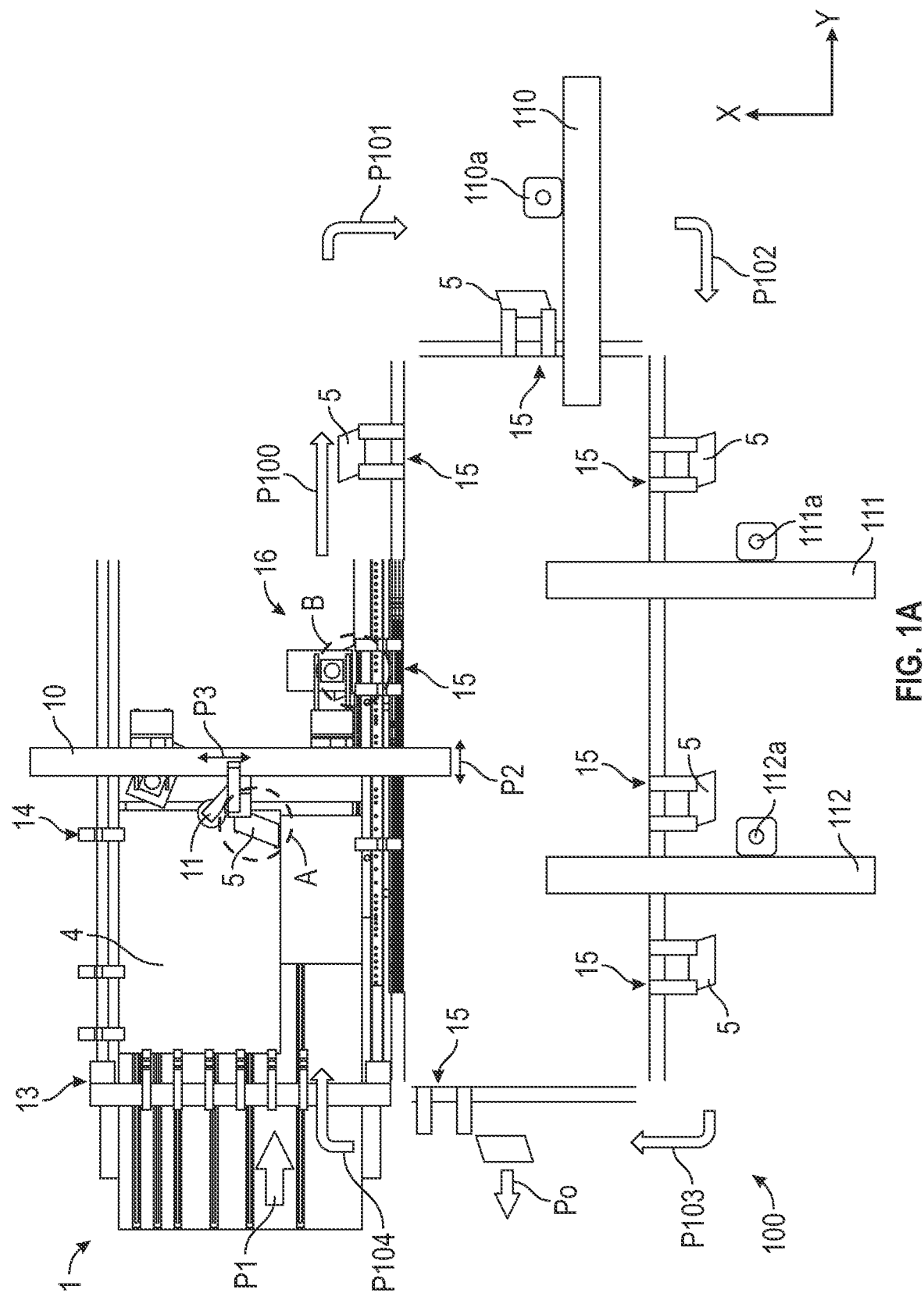
FIG. 1A is a top view of an exemplary device with a connected cycle for carrying out the method according to the invention.

FIG. 1A shows an overview of a possible device by means of which the method according to the invention can be carried out. Many other devices are also conceivable.

The following description of individual components of the device shown in FIG. 1A is therefore given purely by way of example and the components described are optional with regard to the method according to the invention.

The method according to the invention merely requires that, on the one hand, a detachment station 1 is provided, which effects the detachment of large-format panels 4 into individual detached workpieces 5 and, on the other hand, at least one processing station 16, 2, 3 arranged downstream of the detachment station 1 is provided, on which the detached workpiece 5 in any form is handled or otherwise processed. The panel-shaped workpieces in the sense of the invention are preferably those made of wood or wood substitutes. Other materials are conceivable in principle.

In the example shown, the detachment station 1 has a gantry 10 on which a processing unit 11 is arranged such that it is displaceable back and forth in the direction X (direction of the arrow P3). The gantry 10 itself is preferably immovable perpendicular to its direction of extension, but can also be designed to be displaceable in the Y direction. However, the processing unit 11 does not necessarily have to be attached to a gantry 10; it can also be arranged movably in other ways on the detachment station 1 relative to the deposit table 12 of the detachment station 1.

The large-format panel 4 is preferably pushed in the direction of the arrow P1 (parallel to the direction Y) onto the deposit surface of the deposit table 12 and is grasped and fixed there by grippers 13 which act on the transverse side of the large-format panel 4 in relation to the direction Y and/or by grippers 14 which act on the long side of the large-format panel 4 in relation to the direction Y. The grippers 13, 14 are preferably displaceable in the direction Y. For detachment, the processing unit 11, which may be a milling cutter or saw or some other processing unit, carries out, among other things, cuts by which a workpiece 5 is separated out from the large-format panel. In the example shown, this takes place at A (FIG. 4A).

It is now essential for the implementation of the idea underlying the invention that the detached workpiece 5 acquires an alignment section in the separating station 1. With reference to FIGS. 2A to 2B and 3A to 3D, the examples explain what an alignment section may be.

Figure 2A:
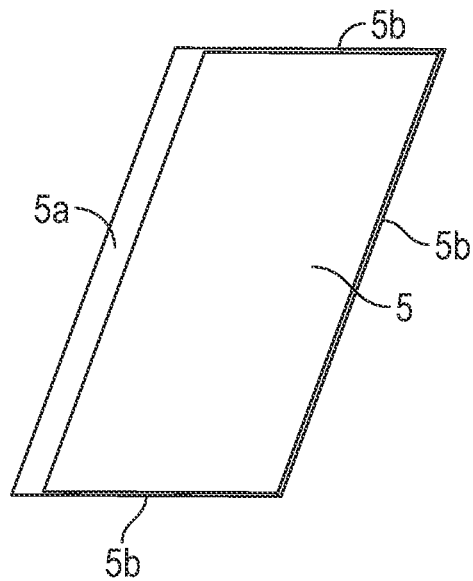
FIG. 2A is a top view of an exemplary workpiece detached in the detachment station with an alignment section in a first embodiment.
Figure 2B:
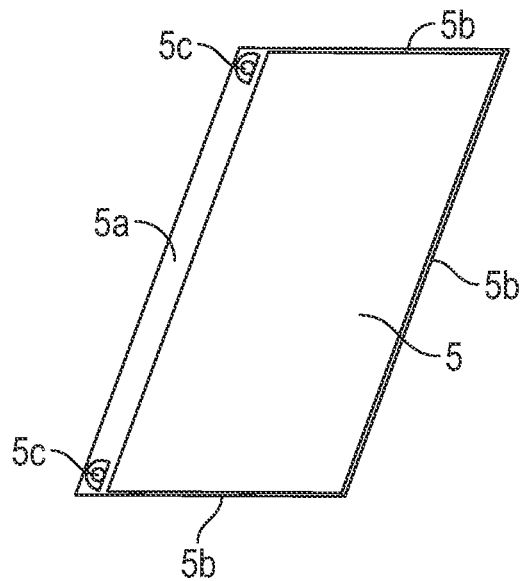
FIG. 2B is a top view of an exemplary workpiece detached in the detachment station with an alignment section in a second embodiment.

On the one hand, as shown in FIG. 2A, an alignment section 5a can be, for example, a material overhang which, unlike for example final cuts 5b in which the detached workpiece 5 already has its final format, still has to be separated from the detached workpiece 5 in a later process step. Alternatively or in addition, it is also possible, as shown for example in FIG. 2B, in which the workpiece 5 has a parallelogram shape and also in FIG. 2A, for example, to introduce or to apply alignment section recesses 5c into the workpiece 5 in the region of the detachment station during the detachment process. In the example shown, the alignment section recesses 5c are, for example, recesses introduced by milling or drilling in which, for example, corresponding centering elements or alignment elements of gripping devices which take over the detached workpiece 5 can engage. Such recesses are preferably not designed to be rotationally symmetrical, so that said gripping devices engage in a more or less form-fitting manner in the workpiece 5 that has been taken over and the gripping device can take up this workpiece with a defined reference position. The machine control then knows precisely how the workpiece 5 is aligned in the machine.

Figure 2C:
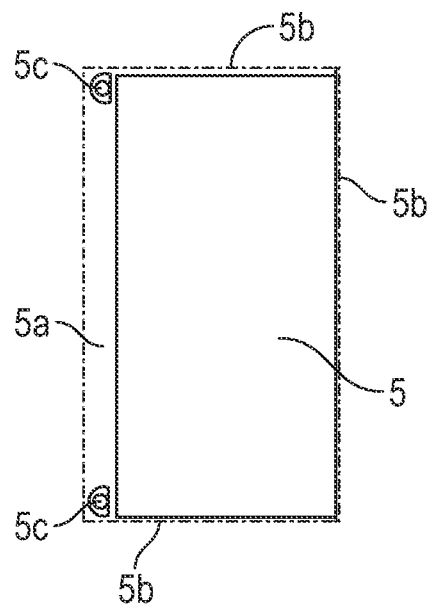
FIG. 2C is a top view of an exemplary workpiece detached in the detachment station with an alignment section in a third embodiment.
Figure 2D:
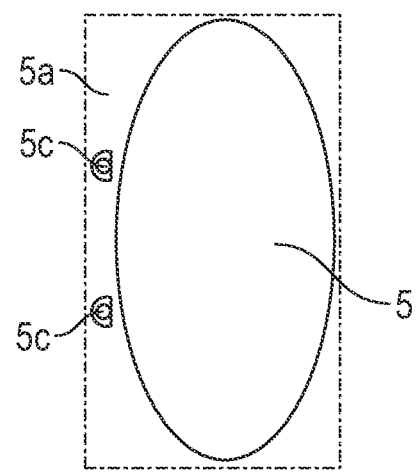
FIG. 2D is a top view of an exemplary workpiece detached in the detachment station with an alignment section in a fourth embodiment.

As shown in FIGS. 2C and 2D, in particular if alignment section 5a and alignment section recesses 5c are combined with each other, after the detachment in the detachment station any shapes (rectangle in FIG. 2C or oval in FIG. 2D) can be transferred to subsequent processing units for further processing steps.

Figure 3B:
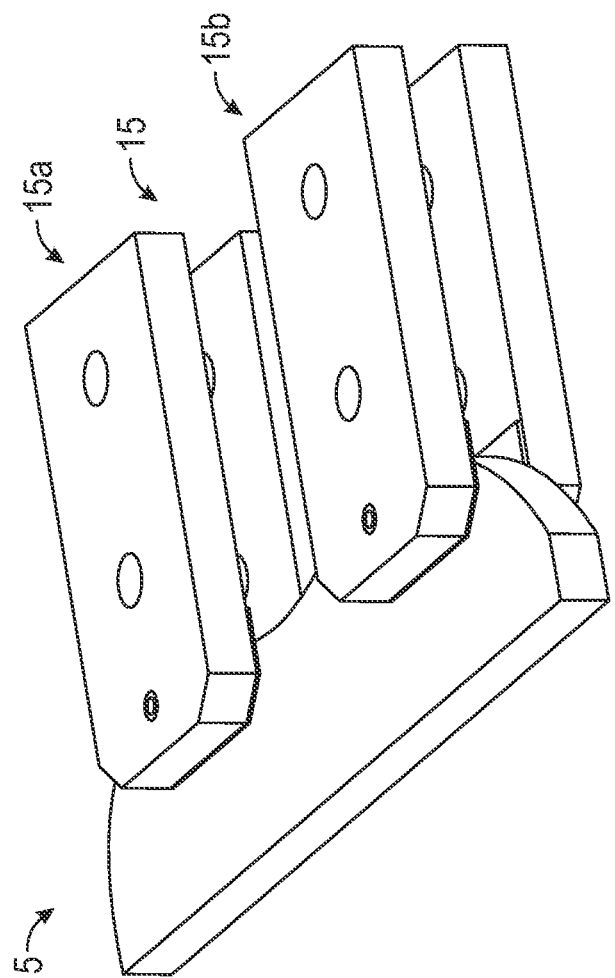
FIG. 3B is a perspective illustration of the workpiece from FIG. 3A, which is gripped by a gripping element, engaging element or gripping element in a form-fitting manner.
Figure 3A:
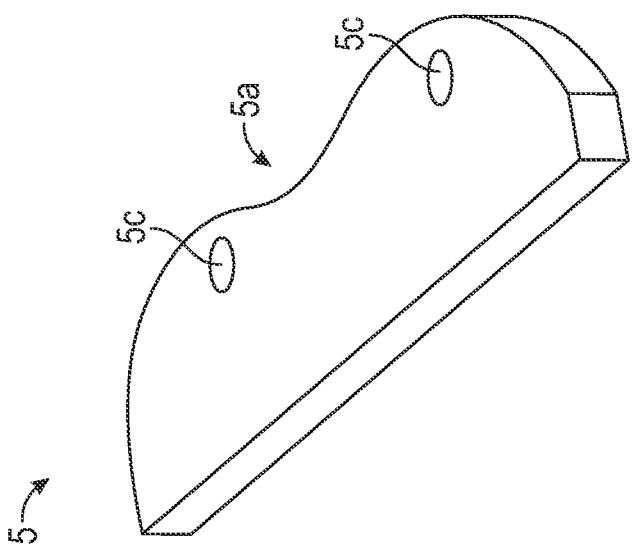
FIG. 3A is a top view of an exemplary workpiece separated in the detachment station with an alignment section in a fifth embodiment in a perspective illustration.
Figure 3D:
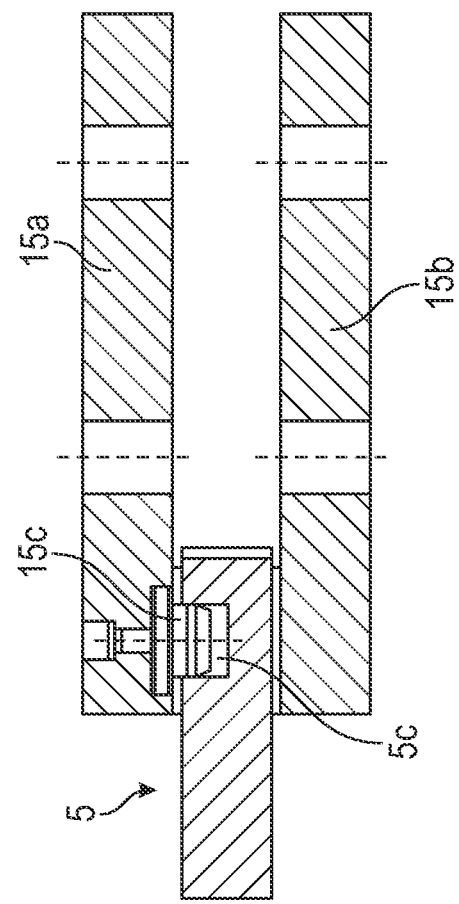
FIG. 3D shows the situation of FIG. 3B as a sectional view.
Figure 3C:
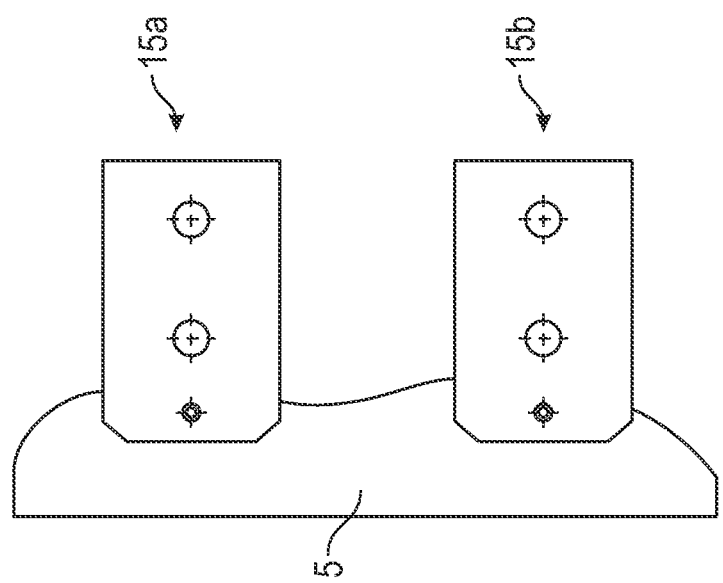
FIG. 3C shows the situation of FIG. 3B in a top view.

In FIG. 3A, the alignment section recesses 5c are, for example, simple bores, which can be, for example, cylindrical bores, through bores or cup bores, into which an alignment element of the gripping element, engaging element or grasping element 15 engages in a form-fitting manner, as can be seen in FIGS. 3B to 3D. In the example shown, the element 15 engages with two cantilevers 15a and 15b, each of which has an alignment element 15c, in the corresponding alignment section recesses 5c. The alignment element 15c can be clearly seen in FIG. 3D, for example, as it penetrates into the alignment section recesses 5c. In the example shown, the alignment element 15c is a pin or mandrel which lies in a form-fitting manner in the alignment section recesses 5c. In this way, the workpiece 5 can be pulled along by the element 15 and transported through the further device.

Figure 1B:
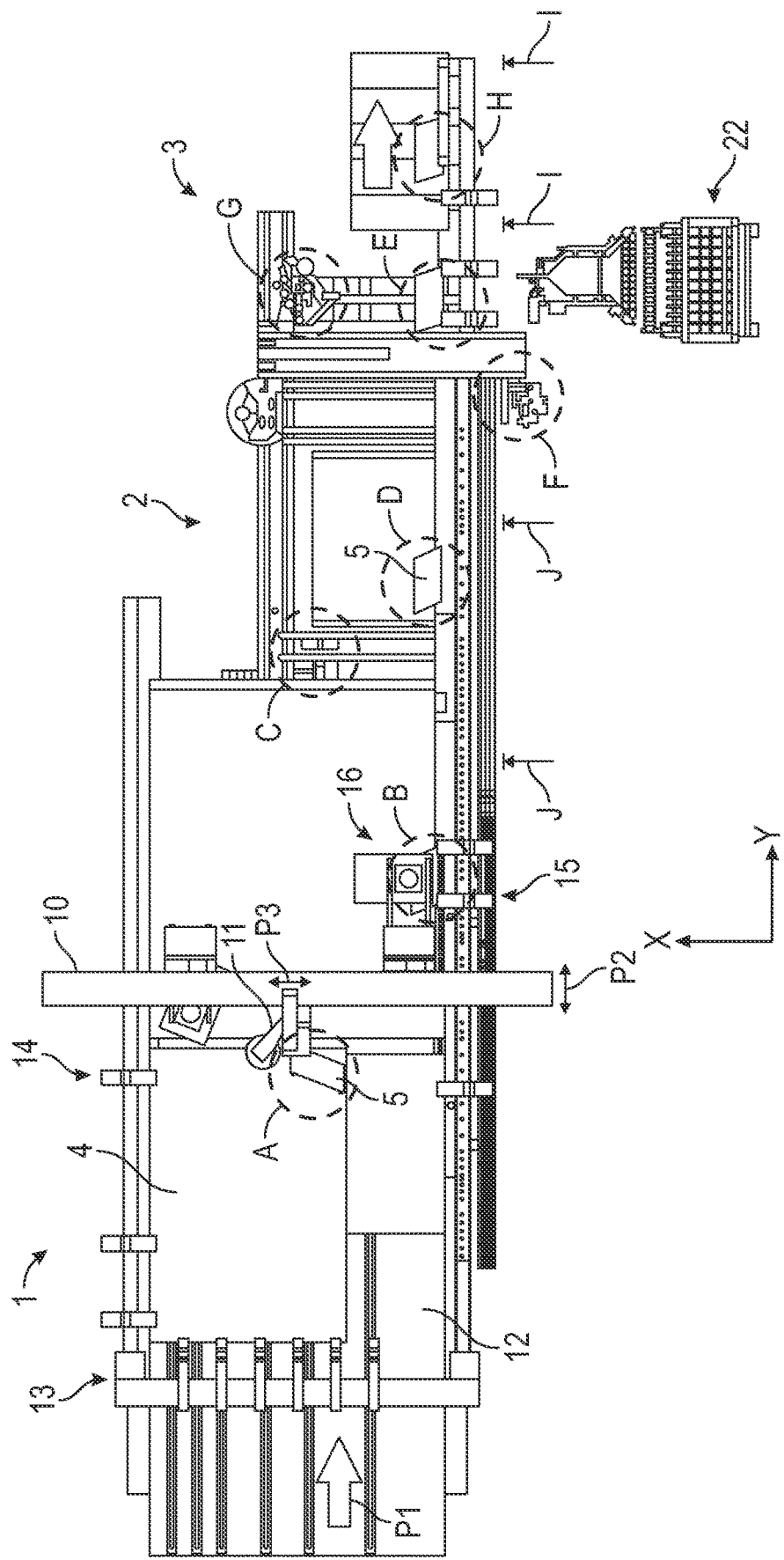
FIG. 1B is a top view of part of a device according to the invention with further processing stations.
Figure 4B:
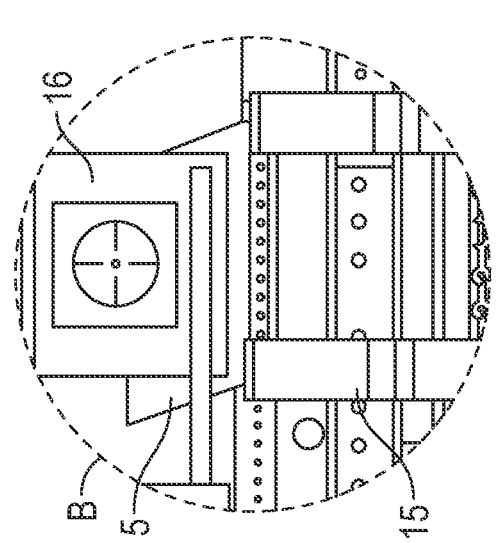
FIG. 4B shows an enlarged detail of the detail B from FIG. 1B.
Figure 4D:
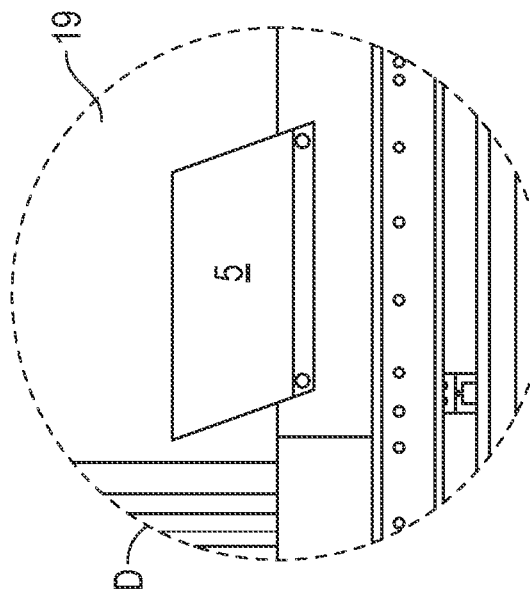
FIG. 4D shows an enlarged detail of the detail D from FIG. 1B.
Figure 4A:
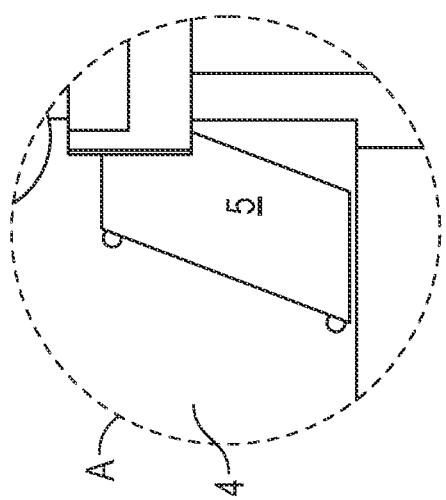
FIG. 4A shows an enlarged detail of the detail A from FIG. 1B.
Figure 4C:
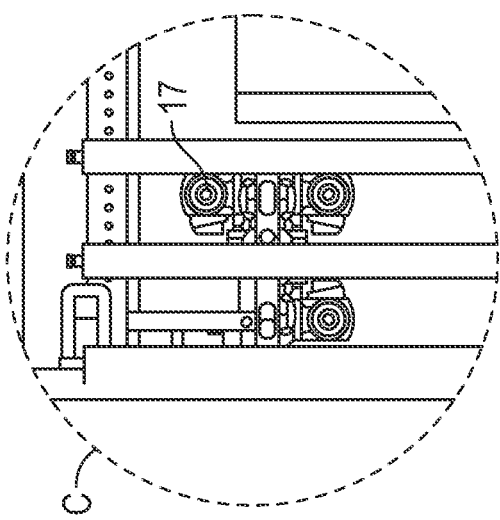
FIG. 4C shows an enlarged detail of the detail C from FIG. 1B.
Figure 4F:
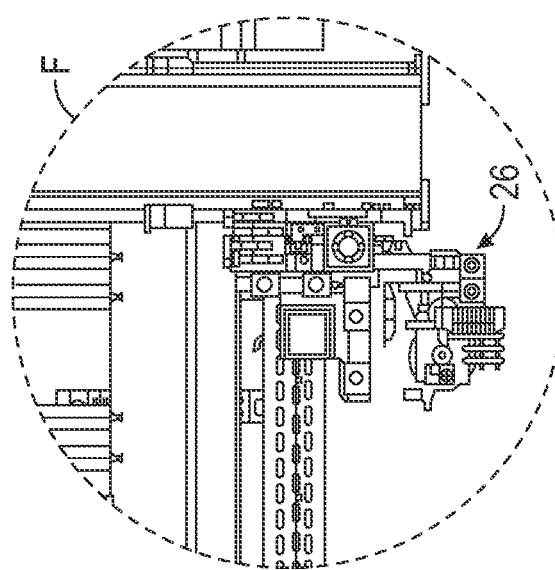
FIG. 4F shows an enlarged detail of the detail F from FIG. 1B.

A corresponding first transfer is shown, for example, in section B of FIGS. 1A and 1B and the associated FIG. 4B. Identical components or similar components of FIGS. 1A and 1B are designated by the same reference signs. In the figures shown, the already detached workpiece is picked up in section B, for example, by a processing station 16 in the form of a rotating device and is rotated by 90° and then transferred to the gripping element, engaging element or grasping element 15, which is preferably at least initially displaceable in the direction Y and takes over the workpiece 5 at the corresponding alignment section and, if necessary, transports it through the further device. According to the invention, the element 15 will then pass through the cycle 100 so that it can pick up the next workpiece 5 in section B after it has passed through (arrows P100, P101, P102, P103, P104).

One or a plurality of processing stations 110, 111, 112 can be run through in the cycle, which in the example shown are designed as gantries with processing units 110a, 111a, 112a. However, the processing station(s) in the cycle 100 can also be different processing stations, as shown, for example, in FIG. 1B and explained in greater detail with reference to FIGS. 4A to 4H. The positive engagement of the element 15 on the corresponding alignment section has the particular advantage that in this way the workpiece can be guided very easily through the cycle 100 and can be processed there from all sides. The workpieces can be ejected from the cycle (arrow P0). Of course, the workpiece can also completely run through the cycle 100 and, for example, without being reintroduced into the cycle at the station B, but instead can continue straight ahead in the direction Y (see FIG. 1B) and can run through further stations C to H.

Once the workpiece has been picked up by the element 15, from this point the machine control knows exactly the orientation in which the workpiece 5 lies in the machine and can run the further processing program based on this. Instead of the devices 15, 16, it is also possible in the corresponding device at this point (B) to use a robot which, on the one hand, rotates the workpiece into a certain position and, on the other hand, can grip the workpiece 5 accordingly on the alignment section 5a or by the final cut 5b.

Rotation is of course optional. The subsequent processing steps—whether they take place in the cycle 100 or at the stations C to H—can be combined with one another as desired or individual processing steps can be omitted. For example, at C (according to FIG. 4C), milling or drilling can be carried out with a corresponding unit 17 (if necessary from the underside of workpiece 5), wherein the above-mentioned grippers 15 can be used to hold the workpiece 5 during this processing step. This can also be achieved by a robot traveling along in the direction Y.

At station D (FIG. 4D) the workpiece 5 can, for example, be placed on a vacuum table 19 or in a buffer and, if necessary, can be taken over by a further group of grippers or clamps which are movable in the direction Y. At the same time or in addition, the transfer of the workpiece 5 to the transport system or a protection system of the subsequent processing station can take place at this point.

There, for example, optionally at F (FIG. 4F), a further processing unit such as a tool changer or a row drilling head 26 or a gluing unit can be provided, which performs processing steps on the workpiece 5.

Likewise, the workpiece 5 at station E (FIG. 4E) can be held by corresponding grippers or clamps 23, 24 and/or shifted in the direction Y, wherein, for example, post-processing can be carried out from the top of the workpiece 5.

Figure 4H:
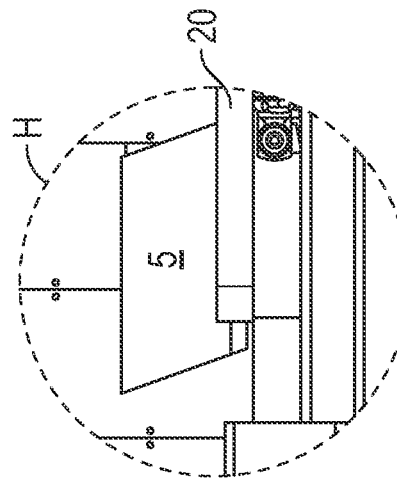
FIG. 4H shows an enlarged detail of the detail H from FIG. 1B.
Figure 4E:
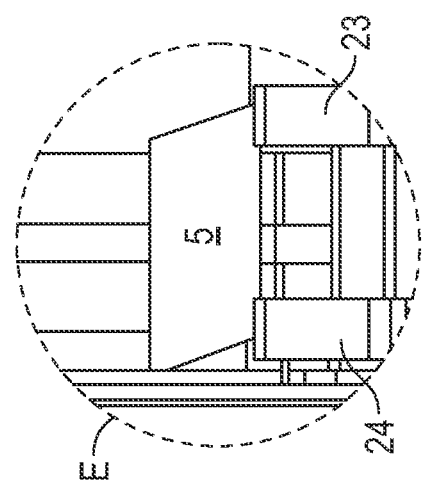
FIG. 4E shows an enlarged detail of the detail E from FIG. 1B.
Figure 4G:
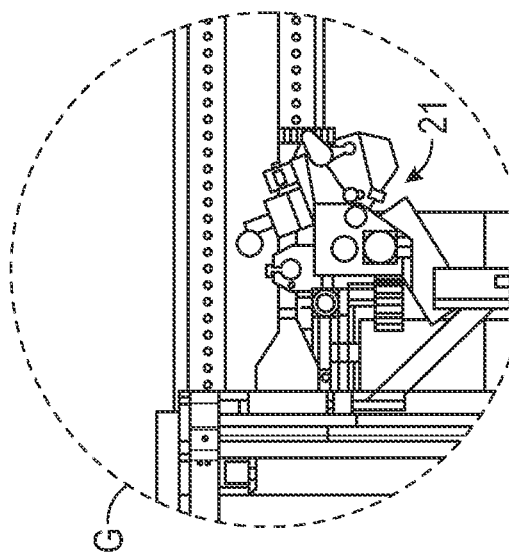
FIG. 4G shows an enlarged detail of the detail G from FIG. 1.

A further optional station is the station G (FIG. 4G). At this point, for example, it is possible to arrange a gluing unit 21 or an attaching unit which is supplied by an edge magazine 22 and is designed for attaching edge bands to the narrow side of the workpiece 5. In theory, it can be attached to three narrow sides of the workpiece, namely wherever the workpiece 5 is not held.

In particular, further final cuts can be made, if required, on the workpiece 5 in stations B to F.

At the station H shown in more detail in FIG. 4H (i.e., preferably at the end of processing), the alignment section 5a can then be removed and the workpiece can be completed at the end for transport. For this purpose, a saw or a milling machine 20 can be provided at this point.

Of course, stations two and three can contain both a through-feed machine and processing centers or can be designed as such.

With the arrangement according to the invention, processing procedures can be optimized because auxiliary measures for the later alignment and referencing of the workpiece 5 detached from the large-format panel 4 can be carried out before the actual processing, so that corresponding set-up times for the actual workpiece processing can be avoided.

What is claimed is:

1. A method for processing panel-shaped workpieces (5), which are made of wood or wood substitutes, in which the following steps are carried out:
   a) providing a large-format panel (4), which is made of wood or wood substitute materials, and feeding (P1) the large-format panel (4) to a detachment station (1);
   b) detaching panel-shaped workpieces (5) by dividing the provided large-format panel (4) in the detachment station (1) by making cuts in the large-format panel (4) using at least one detachment unit (11), wherein at least a part of each of the workpieces (5) thus detached acquires from the detachment unit (11) an alignment section (5a) for engaging gripping elements (14, 15); and
   c) feeding the workpieces (5) thus detached to at least one downstream processing station (2, 3; 110, 111, 112) in order to complete the panel-shaped workpiece (5),
   wherein after the workpiece (5) has been provided with the alignment section (5a), the workpiece (5) is taken over by means of at least one of the gripping elements (14, 15) as an engaging element or grasping element which engages the alignment section (5a), wherein after the workpiece (5) is taken over, the at least one of the gripping elements (14, 15), engaging in a form-fitting manner on the alignment section (5a) of the workpiece (5), runs through a cycle (100),
   wherein the detachment unit (11), in addition to detaching the workpiece (5), is configured to introduce additional processing steps selected from the group consisting of introducing rabbets, introducing grooves, introducing bores, and introducing recesses into the workpiece.

2. The method according to claim 1, wherein the at least one of the gripping elements (14, 15) as an engaging element or grasping element, comprises at least one of a gripper that engages the alignment section (5a) and a centering or aligning element (15c), wherein in step b) an alignment section recess in the form of a reference bore (5c) in which said centering or alignment element (15c) engages is introduced into the alignment section (5a).

3. The method according to claim 1, wherein at least one final cut (5b) is carried out by the detachment unit (11) in step b), wherein the alignment section (5a) is provided on a part of the individual detached workpiece which is free of final cuts.

4. The method according to claim 1, wherein the at least one detachment unit (11) comprises at least one milling unit and/or a sawing unit.

5. The method according to claim 1, wherein the detachment station (1) comprises a processing table (12), wherein the detachment unit (11) is mounted thereon such that it is displaceable in a first direction (X, Y) on a gantry (10).

6. The method according to claim 5, wherein the at least one detachment unit (11) is displaceable in a second direction (X) perpendicular to the first direction (Y).

7. The method according to claim 6, wherein a panel-shaped workpiece (5) is cut out of the large-format panel by bringing the detachment unit (11) into engagement with the large-format panel (4) and moving the large-format panel in the first direction (Y) and/or moving the detachment unit (11) in the second direction (X).

8. A method for processing panel-shaped workpieces (5), which are made of wood or wood substitutes, in which the following steps are carried out:
   a) providing a large-format panel (4), which is made of wood or wood substitute materials, and feeding (P1) the large-format panel (4) to a detachment station (1);
   b) detaching panel-shaped workpieces (5) by dividing the provided large-format panel (4) in the detachment station (1) by making cuts in the large-format panel (4) using at least one detachment unit (11), wherein at least a part of each of the workpieces (5) thus detached acquires from the detachment unit (11) an alignment section (5a) for engaging gripping elements (14, 15); and
   c) feeding the workpieces (5) thus detached to at least one downstream processing station (2, 3; 110, 111, 112) in order to complete the panel-shaped workpiece (5),
   wherein after the workpiece (5) has been provided with the alignment section (5a), the workpiece (5) is taken over by means of at least one of the gripping elements (14, 15) as an engaging element or grasping element which engages the alignment section (5a), wherein after the workpiece (5) is taken over, the at least one of the gripping elements (14, 15), engaging in a form-fitting manner on the alignment section (5a) of the workpiece (5), runs through a cycle (100),
   wherein at least one downstream processing station (2, 3; 110, 111, 112) is arranged in the cycle (100) and is run through by the workpiece (5), and
   wherein at least one of the following processing steps is carried out at the at least one downstream processing station (2, 3; 110, 111, 112):

i) picking up and aligning a detached workpiece (5) on the alignment section (5*a*);
ii) coating a narrow side of the panel-shaped workpiece (5) with an edge strip;
iii) carrying out a final cut on a not yet fully formatted narrow side of the panel-shaped workpiece (5);
iv) introducing at least one bore into the panel-shaped workpiece (5), and
v) providing the panel-shaped workpiece (5) with an edge strip and finishing the workpiece provided with an edge strip.

9. The method according to claim 8, wherein the at least one downstream processing station (2, 3; 110, 111, 112) is selected from the group consisting of a processing center, a through-feed machine, a drilling machine, and a gantry.

10. The method according to claim 2, wherein waste produced in the region of final cuts (5*b*) made in step b) is discarded before or during step c).

11. The method according to claim 8, wherein the alignment section (5*a*) of a panel-shaped workpiece (5) detached in step b) is used in the further processing process to align the workpiece (5) concerned.

12. The method according to claim 1, wherein the alignment section (5*a*) is removed by a final cut or separating cut in or after step c).

13. The method according to claim 8, wherein the alignment section (5*a*) is removed in the last of the at least one downstream processing station (2, 3, 110, 111, 112).

\* \* \* \* \*